Feb. 3, 1942.  W. D. LA RUE  2,271,983
CAPACITOR
Filed Nov. 30, 1937
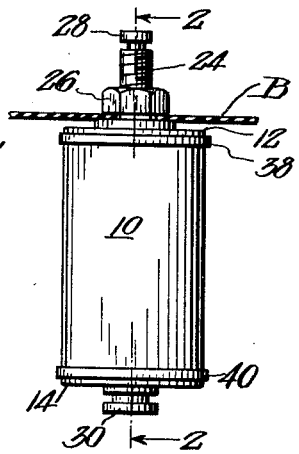
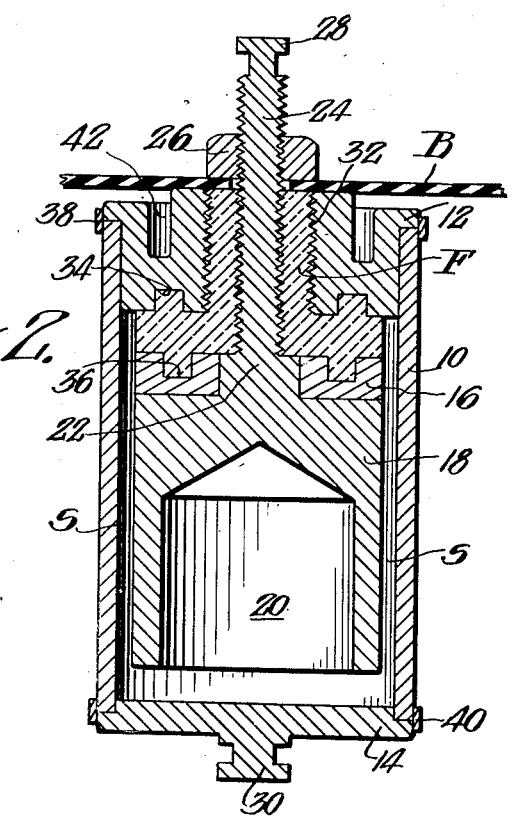
Inventor
William D. La Rue
By
Attorney Patented Feb. 3, 1942

2,271,983

UNITED STATES PATENT OFFICE 2,271,983

CAPACITOR

William D. La Rue, Merchantville, N. J., assignor to Radio Corporation of America, a corporation of Delaware Application November 30, 1937, Serial No. 177,298

6 Claims. (Cl. 175—41)

This invention relates to capacitors, particularly to fixed capacitors, and has special reference to the provision of improvements in temperature-compensated capacitors for use in radio and other circuits for the communication of intelligence.

The principal object of the present invention is to provide a simple inexpensive trouble-free moisture-proof temperature-compensated capacitor which lends itself readily to mass production methods.

Another object of the present invention is to provide a capacitor which shall exhibit a zero or some desired low positive or negative temperature coefficient of capacitance over a temperature range of, say, 30° to 80° C.

Still another object of the present invention is to provide a tubular capacitor, wherein changes in capacitance incident to changes in length of the armatures is compensated for by changes in the effective spacing of said armatures.

Other objects and advantages, together with certain details of construction, will be apparent, and the invention itself will be best understood by reference to the following specification and to the accompanying drawing, wherein—

Figure 1 is an elevational view of a "tubular" capacitor constructed in accordance with the principle of the invention;

Figure 2 is a cross-sectional view taken on the line 2—2 of Figure 1.

It is known to those skilled in the art that changes in capacitance due to temperature changes in a capacitor comprising two coaxial cylinders (formed of the same materials) is due substantially entirely to changes in the length of said cylinders. This is evidenced by the following formula:

Let $r_1$ = radius of outer cylinder
$r_2$ = radius of inner cylinder
$K$ = dielectric constant of material between cylinders
$l$ = length of each cylinder $$C = K \frac{0.2416 l}{\log_{10} \frac{r_1}{r_2}}$$

(This formula makes no allowance for the difference in density of the charge as the ends of the cylinders are approached.)

The fact that the diameter of the outer cylinder will vary more than that of the smaller inner cylinder is of no moment because the negative change in capacitance due to an increase in the inter-armature spacing is substantially exactly compensated for by the positive change in capacitance due to the increased diameter of the cylinders.

In order to compensate for changes in capacitance incident to changes in length due to temperature, the present invention contemplates, and its practice provides, a cylindrical capacitor wherein the inner cylinder is of bipart construction, one part or surface section being constituted, for example, of brass and the other surface section of steel or other metal having a lower temperature coefficient of expansion than brass, whereby the effective spacing between the inner and outer cylinders, at a certain temperature, will be other than that which would obtain if the inner armature was constituted entirely of brass. When the areas of the brass and steel armature surface sections are correctly proportioned, the decrease in capacitance, with an increase in temperature due to the increase in spacing adjacent the steel surface, will compensate for the increase in capacitance due to the increase in the overall length of the inner and outer armatures. A capacitor having a zero temperature coefficient of capacitance, over a range of 30° to 80° C. has been achieved in cylindrical structure, wherein the brass surface of the inner bipart armature was substantially six times larger than that of the steel surface of said armature. Such a capacitor is shown in the drawing.

Here, 10 designates a hollow cylinder formed of brass and having its ends sealed against moisture, in a manner later described, by brass closure elements 12 and 14, respectively. Cylinder 10 constitutes an armature of the capacitor. Presented to the inner surface of armature 10 across an intervening space S are the outer surfaces of a concentrically-mounted bipart armature which comprises a steel part 16 and a brass part 18. The body of the brass part is cut away as indicated at 20 to minimize the capacitance between it and the closure element or cap 14. The brass part 18 of the inner armature is preferably provided at its opposite end with a centrally disposed shoulder 22 around which the smaller steel part or annulus 16 is seated. It will be understood that the steel annulus 16 is mounted to permit of independent movement when subjected to temperature changes, that is to say, it is not rigidly secured to the brass part 18 as in prior art capacitors employing bimetal strips as armatures. A rod-like neck 24 extends from shoulder 22 through an orifice in closure element 12 to the exterior of the capacitor. Rod 24 is threaded to receive a nut 26 for attachment to an insulating base B of a radio set and is provided at its outer extremity with a binding post 28 by means of which an electrical connection may be made to the interior of the capacitor. A similar binding post 30 is provided on the "lower" closure element 14 for connecting the outer cylindrical armature 10 in circuit.

One problem encountered in reducing the invention to practice was that of providing a perfect moisture-proof seal without unduly increasing the size of the capacitor and its closure elements. To this end, the effective area of the "top" closure element 12 is greatly increased by threads 32 and by a groove 34 on its vertical and bottom surfaces, respectively. The top surface of the steel armature 16 is provided with a similar groove 36. Further, the rod-like neck 24, which extends through the orifice in the closure element 12, is threaded throughout its length whereby the surface area which it presents to a moisture-proof filling F is greatly increased without any increase in its overall dimensions. Styrol or a polymerization product thereof is preferably employed as the filling material.

The closure elements 12 and 14 are preferably welded or otherwise intimately bonded to the outer armature 10, as at 38, 40, respectively. In order to dissipate heat incident to the bonding operation, the outer surface area of the element 12 is preferably increased by the provision of a hollow groove 42.

As previously set forth, the usual cylindrical capacitor will exhibit a positive temperature coefficient of capacitance due to the increase in the length of the cylinder when subject to an increase in temperature. In capacitors constructed in accordance with the present invention, such increase is compensated for, to any desired degree, by the relative increase in spacing adjacent the steel armature section due to the relatively greater coefficient of expansion of the opposed, outer armature.

Certain modifications of the invention will suggest themselves to those skilled in the art. It is to be understood, therefore, that the foregoing is to be interpreted as illustrative and not in a limiting sense, except as required by the prior art and by the spirit of the appended claims.

What is claimed is:

1. A capacitor comprising a pair of coaxially arranged cylindrical metal armatures presented in useful capacitive relation across an intervening space to the interior of a third cylindrical metal armature, said pair of armatures being constituted of different metals and being mounted to permit of independent movement when subject to temperature changes.

2. A capacitor comprising a cylindrical brass and a cylindrical steel armature mounted in coaxial relation and presented in capacitive relation across an intervening space to the interior of a concentrically mounted cylindrical brass armature.

3. The invention as set forth in claim 2 wherein the armature area of said first-mentioned brass armature is substantially six times larger than that of said steel armature.

4. A capacitor comprising a cylindrical metal armature presented in useful capacitive relation across an intervening space to the interior of a second cylindrical metal armature, the inner of said cylinders having a portion of its outer surface constituted of a metal which exhibits a different coefficient of expansion than the metal of which the balance of its said surface is constituted.

5. A capacitor comprising a pair of concentrically-mounted, spaced, cylindrical, metal armatures, the inner cylinder being of a length less than that of the outer cylinder, a cap closing one end of the outer cylinder, an annulus seated within said outer cylinder adjacent the opposite end thereof out of contact with the inner cylinder said inner cylinder having a rod-like extension which extends through the orifice in the annulus and to which an electrical connection may be made, a moisture-proof filling in the cavity defined by the opposed surfaces of the inner cylinder, annulus, and rod-like extension, the surfaces of said members which are presented to the moisture-proof filling being of extended area.

6. The invention as set forth in claim 5, wherein said annulus is intimately bonded to the outer cylinder, and the outer surface of said annulus is grooved to provide an extended area capable of dissipating the heat incident to the bonding operation.

WILLIAM D. LA RUE.